(12) United States Patent
Schulte et al.

(10) Patent No.: US 7,825,530 B2
(45) Date of Patent: Nov. 2, 2010

(54) GENERATOR VOLTAGE STABILIZATION SYSTEM AND METHOD

(75) Inventors: Juergen J. Schulte, San Diego, CA (US); David M. Mazaika, San Diego, CA (US)

(73) Assignee: ISE Corporation, Poway, CA (US)

( * ) Notice: Subject to any disclaimer, the term of this patent is extended or adjusted under 35 U.S.C. 154(b) by 671 days.

(21) Appl. No.: 11/770,951

(22) Filed: Jun. 29, 2007

(65) Prior Publication Data

US 2009/0001732 A1  Jan. 1, 2009

(51) Int. Cl.
*F02D 29/06* (2006.01)
*H02P 9/04* (2006.01)

(52) U.S. Cl. .................................. 290/40 B; 290/40 C

(58) Field of Classification Search ............... 290/40 B, 290/40 C, 1 R; 180/65.24, 65.26, 65.28, 180/65.285, 65.31, 65.51, 65.8, 65.21
See application file for complete search history.

(56) References Cited

U.S. PATENT DOCUMENTS

| | | | | |
|---|---|---|---|---|
| 5,214,358 A * | 5/1993 | Marshall | ...................... | 318/139 |
| 5,550,445 A * | 8/1996 | Nii | .............................. | 318/153 |
| 5,568,023 A * | 10/1996 | Grayer et al. | ............... | 318/139 |
| 5,589,743 A * | 12/1996 | King | ........................... | 318/139 |
| 5,765,656 A * | 6/1998 | Weaver | .................... | 180/65.22 |
| 5,848,659 A * | 12/1998 | Karg et al. | ............. | 180/65.245 |
| 6,484,830 B1 * | 11/2002 | Gruenwald et al. | ..... | 180/65.245 |
| 6,624,529 B2 * | 9/2003 | Obayashi | ................... | 290/40 C |
| 6,639,328 B2 | 10/2003 | Wacknov | | |
| 7,061,131 B2 * | 6/2006 | King et al. | ................. | 290/40 C |
| 2002/0070557 A1 * | 6/2002 | Geis | ......................... | 290/40 R |
| 2004/0129465 A1 * | 7/2004 | Yamaguchi | ................. | 180/65.2 |
| 2005/0179264 A1 * | 8/2005 | Ganev | ....................... | 290/40 C |
| 2006/0076171 A1 | 4/2006 | Donnelly et al. | | |
| 2006/0152085 A1 | 7/2006 | Flett et al. | | |
| 2006/0284843 A1 * | 12/2006 | Endou et al. | ................. | 345/161 |

FOREIGN PATENT DOCUMENTS

EP            1383233         1/2004

OTHER PUBLICATIONS

International Search Report and Written Opinion for PCT/US08/67093 dated Sep. 19, 2008.

* cited by examiner

*Primary Examiner*—Julio C. Gonzalez
(74) *Attorney, Agent, or Firm*—Stephen C. Beuerle; Procopio Cory Hargreaves & Savitch LLP

(57) ABSTRACT

A generator voltage stabilization system of a heavy-duty vehicle hybrid-electric drive system, which has an engine and a generator coupled with the engine for generating power that varies with rotational speed of the engine, includes one or more circuits having at least one of a DC/DC converter and an DC/AC converter configured to be coupled to the generator, and receive varying power input from the generator and provide stabilized voltage output power; and a control computer coupled to the one or more circuits to control the one or more circuits to provide stabilized voltage output power with varying power input from the generator.

14 Claims, 2 Drawing Sheets

GENERATOR VOLTAGE STABILIZATION SYSTEM AND METHOD

FIELD OF THE INVENTION

The field of the invention relates, in general, to generator voltage stabilization systems, and, in particular, to generator voltage stabilization systems for heavy-duty vehicle hybrid-electric drive systems.

BACKGROUND OF THE INVENTION

A rotary generator is connected to the crankshaft of an internal combustion engine. The generator develops electrical power by moving conductors though a magnetic field or moving a magnetic field through conductors as what happens when the generator shaft is rotated by the connection to the crankshaft of the internal combustion engine. An electromotive force or voltage (emf) is developed in the generator conductors and is proportional to the relative speed between the magnetic field and the conductors. In other words, the generator output voltage is proportional to the engine rotations per minute (rpm). Therefore, the engine speed is controlled to maintain a constant rpm to maintain a constant DC voltage required by applications requiring high DC power. Having to maintain the engine speed at a constant rpm in order to deliver a constant DC voltage is problematic. Electric loads can change much faster than the engine can change rpm thus causing dips and spikes in the generator output voltage that result from the imbalance between the mechanical and electrical loads. The changing voltage must be accepted by the using equipment (inverters, controllers, etc.) without damaging the equipment.

SUMMARY OF THE INVENTION

To overcome the problem of having to maintain the engine speed at a constant rpm in order to deliver a constant DC voltage, an aspect of the present invention involves using a DC/DC converter with the generator to stabilize the output DC voltage independent of the engine rpm.

Another aspect of the invention involves a generator voltage stabilization system of a heavy-duty vehicle hybrid-electric drive system having an engine and a generator coupled with the engine for generating voltage that varies with rotational speed of the engine. The generator voltage stabilization system includes one or more circuits having at least one of a DC/DC converter and an DC/AC converter configured to be coupled to the generator, and receive varying voltage power input from the generator and provide stabilized voltage output power; and a control computer coupled to the one or more circuits to control the one or more circuits to provide stabilized voltage output power with varying voltage power input from the generator.

A further aspect of the invention involves a method for stabilizing output voltage of a generator of a heavy-duty vehicle hybrid-electric drive system of a heavy-duty vehicle over 10,000 pounds GVWR, the heavy-duty vehicle hybrid-electric drive system including an engine and a generator coupled with the engine for generating power that varies with rotational speed of the engine. The method includes generating output voltage with the generator that varies with the speed of the engine; receiving varying power input from the generator with one or more circuits having at least one of a DC/DC converter and an DC/AC converter; and converting varying power input from the generator to a stabilized voltage output power with the one or more circuits

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF A PREFERRED EMBODIMENT

Figure 1:
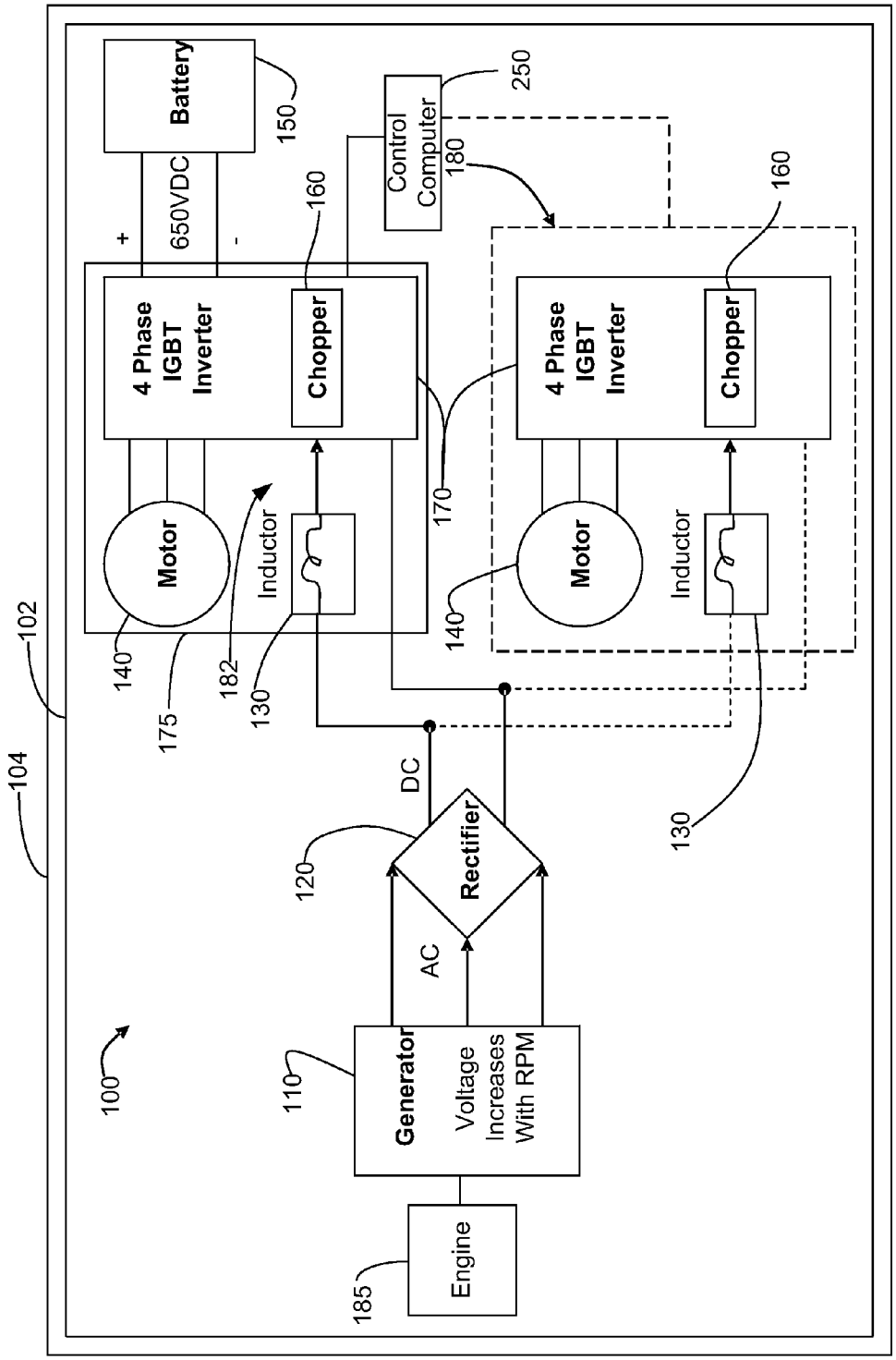
FIG. 1 is a block diagram of an embodiment of a generator voltage stabilization system of a heavy-duty vehicle hybrid-electric drive system for a heavy-duty vehicle.

With reference to FIG. 1, an embodiment of a generator voltage stabilization system 100 of a heavy-duty vehicle hybrid-electric drive system 102 for a heavy-duty vehicle 104 will be described. As used herein, a heavy-duty vehicle is a vehicle over 10,000 pounds GVWR (Gross Vehicle Weight Rating). Although the generator voltage stabilization system 100 will be described in conjunction with a hybrid-electric drive system, in alternative embodiments, the generator voltage stabilization system 100 is used with other systems such as, but not limited to, engine generator sets for stand alone power, mobile power, remote power, and emergency or back up engine generator power. Further, although the generator voltage stabilization system 100 will be described in conjunction with a heavy duty vehicle, in alternative embodiments, the generator voltage stabilization system 100 is used with other vehicles such as, but not limited to, train locomotives, mining equipment, and off road construction equipment.

The generator voltage stabilization system 100 includes one or more DC/DC and/or DC/AC controller circuits 175, 180 that receive varying power levels from one or more generators 110 (via rectifier(s) 120) and supply steady power output to and control one or more motors 140 and/or other loads (e.g., battery 150). The DC/DC and/or DC/AC controller circuit(s) 175, 180 stabilize the output DC voltage from the generator(s) 110 independent of engine rpm.

One or more generators 110 are connected to the crankshaft(s) of one or more engines (e.g., internal combustion engine, diesel engine) 185. The generator(s) 110 develop electrical power by moving conductors though a magnetic field or moving a magnetic field through conductors as what happens when the generator shaft is rotated by the connection to the crankshaft of engine 185. An electromotive force (emf) or voltage is developed in the generator conductors and is proportional to the relative speed between the magnetic field and the conductors. Thus, the output voltage from the generator(s) is proportional to the engine rpm. In the embodiment shown, the generator(s) 110 have a three-phase AC voltage output.

One or more multiple diode rectifiers 120 convert the three-phase AC voltage output to a DC voltage before the DC current is passed to the one or more DC/DC and/or DC/AC controller circuits 175, 180.

The DC/DC and/or DC/AC controller circuit(s) 175, 180 include inductor 130 and IGBT solid state high power switching circuit 170. DC current from the rectifier 120 is passed through the inductor 130 and one phase (i.e., chopper 160) of an IGBT solid state high power switching circuit 170. The inductor 130 and the chopper 160 form a DC/DC converter 182 that receive varying voltage power levels from the generator 110 in response load power demands (via rectifier 120) and supply steady voltage high-power output to the motor 140 and/or battery 150.

As shown in the top of FIG. 1, one or more energy storage(s) (e.g., 650 volt battery/batteries) 150 are coupled the DC/DC and/or DC/AC controller circuit 175. The DC output of the controller circuit 175 is compatible with the output of energy storage (e.g., 650 volt battery) 150. Control computer 250 controls controller circuit 175 so that DC output of controller circuit 175 is combined with power from the energy storage (e.g., 650 volt battery) 150 to drive a three phase AC (induction or permanent magnet) motor 140 by means of three more IGBT switching phases 170, which form an inverter/controller, of controller circuit 175. in an exemplary embodiment or implementation, the motor 140 includes one or more electric drive motors 140. Electrical energy is supplied to the drive motor(s), and mechanical output(s) of drive motor(s) are summed in combining gear box (CGB), which delivers mechanical power to vehicle traction drive system of the heavy-duty vehicle 104 to propel and accelerate the vehicle 104

In another embodiment or further implementation, the control computer 250 controls controller circuit 175 so that DC output of the DC/DC controller circuit 175 is used to charge the energy storage (e.g., 650 volt battery) 150. The switching action of the 4-phase IGBT Inverter controller circuit 175 is controlled by a microprocessor of the control computer 250 to implement the DC/DC converter and the motor controller.

As shown in the bottom of FIG. 1, in one or more embodiments, the generator voltage stabilization system 100 includes one or more additional DC/DC and/or DC/AC controller circuits 180 that receive varying voltage and power levels from the one or more generators 110 (via rectifier(s) 120) and supply steady voltage power output to and control one or more motors 140 and/or other loads. For example, but not by way of limitation, the one or more control circuits 180 include one or more DC/AC controller circuits 180 that supply 230 volts 3-phase AC power for one or more vehicle accessories (e.g., an air conditioner, a hydraulic pump, an air compressor, one or more fans, one or more blowers, a water pump, an oil pump, a fuel pump, a vacuum pump, and/or an electric hydraulic actuator).

Thus, the generator voltage stabilization system 100 of the one or more DC/DC and/or DC/AC controller circuits 175, 180 overcomes the problem of having to maintain the engine speed at a constant rpm in order to deliver a constant DC voltage. The DC/DC (and/or DC/AC) converter(s) of the controller circuit(s) 175, 180 are combined with the generator(s) 110 to stabilize the output DC voltage independent of the engine rpm. This relaxes the dynamic requirements placed on the engine 185 and allows the engine 185 and load devices to operate at optimum efficiency without inefficient and potentially damaging voltage dips and spikes.

Figure 2:
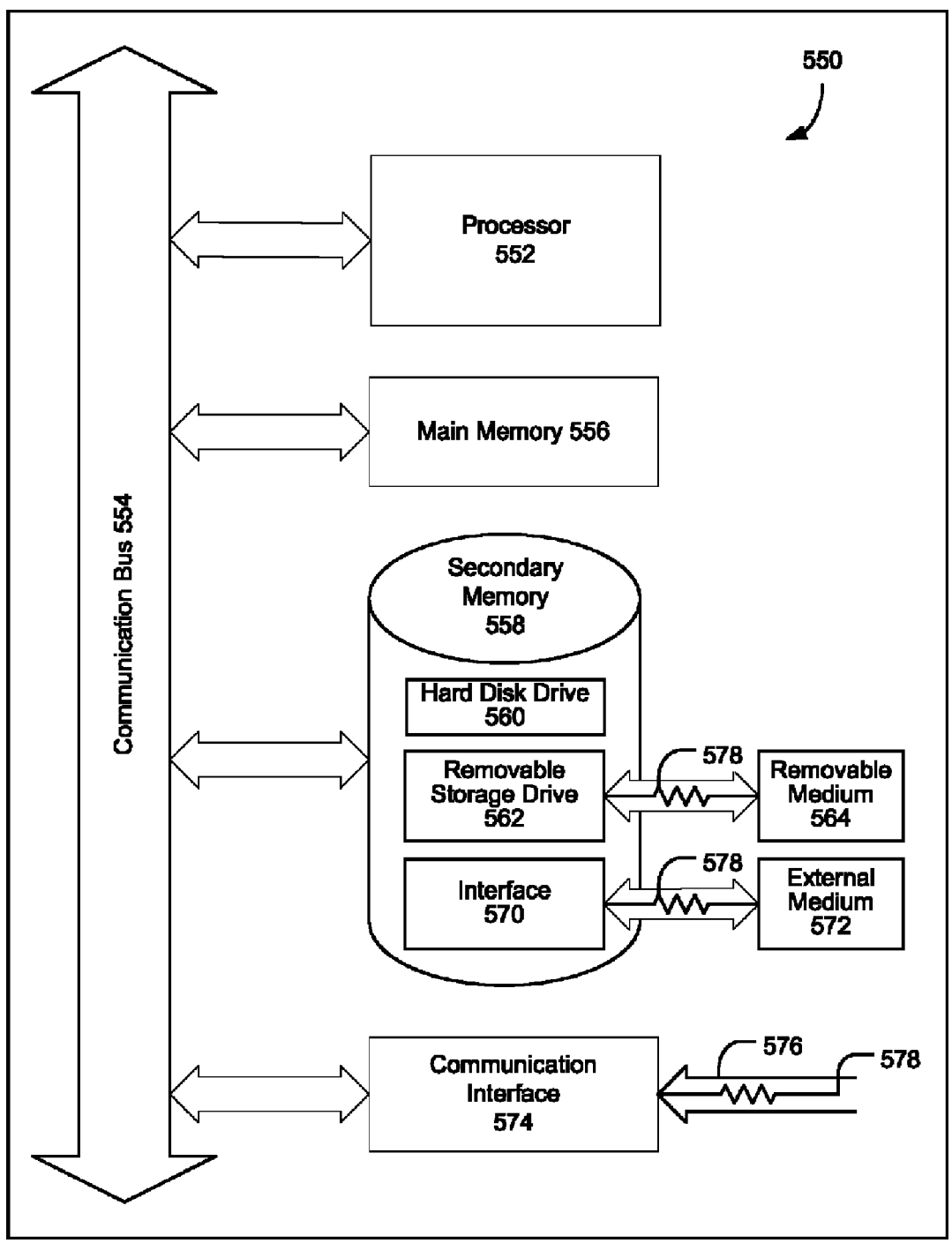
FIG. 2 is a block diagram illustrating an exemplary computer system that may be used in connection with the various embodiments described herein.

FIG. 2 is a block diagram illustrating an exemplary computer system 550 that may be used in connection with the various embodiments described herein. For example, the computer system 550 (or various components or combinations of components of the computer system 550) may be used in conjunction with the one or more control computers 250, controllers of the one or more DC/DC and/or DC/AC controller circuits 175, 180, and/or to control the functions described herein. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Ram bus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A system for operating a heavy-duty vehicle hybrid-electric drive system of a heavy-duty vehicle over 10,000 pounds GVWR, the heavy-duty vehicle hybrid-electric drive system including an engine configured to provide a rotating output, the system comprising:
   a generator mechanically coupled to the engine, the generator configured to generate an AC power having a variable AC voltage that varies with rotational speed of the engine rotating output;
   a rectifier electrically coupled to the generator, the rectifier configured to rectify the generated AC power, and further configured to output a first DC power having a variable DC voltage that varies with rotational speed of the engine rotating output;
   a DC/DC converter electrically coupled to the rectifier, the DC/DC converter configured to receive the first DC power, and further configured to output a second DC power;
   a controller configured to control the DC/DC converter such that the second DC power outputted from the DC/DC converter is outputted having a stabilized DC voltage that does not vary with rotational speed of the engine;
   a DC/AC inverter electrically coupled to the DC/DC converter, the DC/AC inverter configured to invert the second DC power and output an AC power having a stabilized AC voltage that does not vary with rotational speed of the engine; and,
   an electric motor electrically coupled to the DC/AC inverter and mechanically coupled to at least one drive wheel of the heavy-duty vehicle, the electric motor configured to be driven using the AC power having the stabilized AC voltage,
   wherein the generator is further configured to generate three-phase AC power;
   wherein the rectifier is further configured to rectify the generated three-phase AC power;
   wherein the DC/AC inverter comprises three phases of a four-phase IGBT inverter;
   wherein the electric motor comprises a three-phase electric motor and is electrically coupled to the three phases of the four-phase IGBT inverter;
   wherein the DC/DC converter comprises a reactive inductor and an IGBT solid state high power switching circuit in a choppered configuration, and,
   wherein the IGBT solid state high power switching circuit comprises a fourth phase of the four-phase IGBT inverter.

2. The system of claim 1, wherein the engine is further configured to provide a variable rotating output in response to load power demands, and to operate at an optimum efficiency.

3. The system of claim 1, wherein the rectifier comprises one or more multiple-diode rectifiers.

4. The system of claim 1, wherein the controller is configured to provide an output power having a stabilized voltage, that does not vary with rotational speed of the engine, to drive at least one of the following vehicle accessories: an air conditioner, a hydraulic pump, an air compressor, one or more fans, one or more blowers, a water pump, an oil pump, a fuel pump, a vacuum pump, and an electric hydraulic actuator.

5. The system of claim 1, wherein the controller is configured to provide an output power having a stabilized voltage, that does not vary with rotational speed of the engine, to charge an energy storage device.

6. The system of claim 1, wherein the generator is further configured to generate multiple-phase AC power; and,
   wherein the rectifier is further configured to rectify the generated multiple-phase AC power.

7. The system of claim 1, wherein the generator is further configured to generate three-phase AC power; and,
   wherein the rectifier is further configured to rectify the generated three-phase AC power.

8. A method for operating a heavy-duty vehicle hybrid-electric drive system of a heavy-duty vehicle over 10,000 pounds GVWR, the heavy-duty vehicle hybrid-electric drive system including an engine configured to provide a rotating output and a generator mechanically coupled to the engine, the method comprising:
   generating an AC power via the generator, the AC power having a variable AC voltage that varies with rotational speed of the engine rotating output;
   rectifying the generated AC power via a rectifier;
   outputting a first DC power from the rectifier, the first DC power having a variable DC voltage that varies with rotational speed of the engine rotating output;
   receiving the first DC power into a DC/DC converter electrically coupled to the rectifier;
   outputting a second DC power from the DC/DC converter;
   controlling the DC/DC converter via a controller, such that the second DC power is outputted having a stabilized DC voltage that does not vary with rotational speed of the engine;
   inverting the second DC power through a DC/AC inverter electrically coupled to the DC/DC converter;
   outputting an AC power having a stabilized AC voltage, that does not vary with rotational speed of the engine, from the DC/AC inverter; and,
   driving an electric motor electrically coupled to the DC/AC inverter and mechanically coupled to at least one drive wheel of the heavy-duty vehicle using the stabilized AC voltage;
   wherein the generator is further configured to generate three-phase AC power;
   wherein the rectifier is further configured to rectify the generated three-phase AC power;
   wherein the DC/AC inverter comprises three phases of a four-phase IGBT inverter;
   wherein the electric motor comprises a three-phase electric motor and is electrically coupled to the three phases of the four-phase IGBT inverter;
   wherein the DC/DC converter comprises a reactive inductor and an IGBT solid state high power switching circuit in a choppered configuration, and,
   wherein the IGBT solid state high power switching circuit comprises a fourth phase of the four-phase IGBT inverter.

9. The method of claim 8, wherein the engine is further configured to provide a variable rotating output in response to load power demands, and to operate at an optimum efficiency.

10. The method of claim 8, wherein the rectifier comprises one or more multiple-diode rectifiers.

11. The method of claim 8, wherein the controller is configured to provide an output power having a stabilized voltage, that does not vary with rotational speed of the engine, to drive at least one of the following vehicle accessories: an air conditioner, a hydraulic pump, an air compressor, one or more fans, one or more blowers, a water pump, an oil pump, a fuel pump, a vacuum pump, and an electric hydraulic actuator.

12. The method of claim 8, wherein the controller is configured to provide an output power having a stabilized voltage, that does not vary with rotational speed of the engine, to charge an energy storage device.

13. The method of claim 8, wherein the generator is further configured to generate multiple-phase AC power; and,
wherein the rectifier is further configured to rectify the generated multiple-phase AC power.

14. The method of claim 8, wherein the generator is further configured to generate three-phase AC power; and,
wherein the rectifier is further configured to rectify the generated three-phase AC power.

* * * * *